(12) United States Patent
Cho et al.

(10) Patent No.: US 8,873,834 B2
(45) Date of Patent: Oct. 28, 2014

(54) METHOD AND APPARATUS FOR PROCESSING MULTI-VIEW IMAGE USING HOLE RENDERING

(75) Inventors: Yang Ho Cho, Hwaseong-si (KR); Du-Sik Park, Suwon-si (KR); Ho Young Lee, Suwon-si (KR); Kyu Young Hwang, Hwaseong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 232 days.

(21) Appl. No.: 13/467,640

(22) Filed: May 9, 2012

(65) Prior Publication Data

US 2013/0016897 A1    Jan. 17, 2013

Related U.S. Application Data

(60) Provisional application No. 61/506,798, filed on Jul. 12, 2011.

(30) Foreign Application Priority Data

Oct. 7, 2011    (KR) .......................... 10-2011-0102374

(51) Int. Cl.
*G06T 15/00* (2011.01)
*H04N 13/00* (2006.01)

(52) U.S. Cl.
CPC ................................ *H04N 13/0011* (2013.01)
USPC ........................................................ 382/154

(58) Field of Classification Search
None
See application file for complete search history.

(56) References Cited

U.S. PATENT DOCUMENTS

| 5,613,048 | A | 3/1997 | Chen et al. |
| 6,052,125 | A | 4/2000 | Gardiner et al. |
| 2010/0103249 | A1* | 4/2010 | Lipton et al. ................... 348/51 |
| 2011/0058021 | A1 | 3/2011 | Chen et al. |

FOREIGN PATENT DOCUMENTS

| EP | 1063614 | 12/2000 |
| KR | 10-2005-0061550 | 6/2005 |
| KR | 10-2007-0061011 | 6/2007 |
| KR | 10-2010-0088774 | 8/2010 |
| KR | 10-2011-0036591 | 4/2011 |
| KR | 10-2011-0059803 | 6/2011 |

OTHER PUBLICATIONS

Daribo et al, "Depth-aided image inpainting for Novel View Synthesis", MMSP'10, Oct. 4-6, 2010, Saint-Malo, France, 2010, IEEE publication, pp. 167-170.*
Choi et al., "Hole Filling With Random Walks Using Occlusion Constraints in View Synthesis", IEEE publication, 2005, pp. 2005-2008.*
Extended European Search Report issued Dec. 6, 2012, in corresponding European Patent Application No. 12160911.9.

* cited by examiner

*Primary Examiner* — Brian P Werner
(74) *Attorney, Agent, or Firm* — Staas & Halsey LLP

(57) ABSTRACT

A method and apparatus for processing a multi-view image are provided. A priority may be assigned to each hole pixel in a hole region generated when an output view is generated. The priority of each hole pixel may be generated by combining a structure priority, a confidence priority, and a disparity priority. Hole rendering may be applied to a target patch including a hole pixel having a highest priority. The hole pixel may be restored by searching for a source patch most similar to a background of the target patch, and copying a pixel in the found source patch into a hole pixel of the target patch.

20 Claims, 9 Drawing Sheets

First output view (left)　　Distinguish structure

Second output view (right)　　Distinguish structure

First target patch

Second target patch

Output view

METHOD AND APPARATUS FOR PROCESSING MULTI-VIEW IMAGE USING HOLE RENDERING

CROSS-REFERENCE TO RELATED APPLICATIONS

This application claims the benefit under 35 U.S.C. §119 (e) of U.S. Provisional Application No. 61/506,798, filed on Jul. 12, 2011, in the U.S. Patent and Trade Mark Office, and the benefit under 35 U.S.C. §119(a) of Korean Patent Application No. 10-2011-0102374, filed on Oct. 7, 2011, in the Korean Intellectual Property Office, the entire disclosures of which are incorporated herein by reference for all purposes.

BACKGROUND

1. Field

Example embodiments relate to a method and apparatus for processing a multi-view image, and more particularly, to a method and apparatus for generating a multi-view image using hole rendering based on a priority.

2. Description of the Related Art

A multi-view image apparatus outputs a plurality of videos created from different viewpoints. In order to transmit information about all multi-view videos and store the information in the image apparatus in real time, a storage device having a high capacity, a highly efficient transmission line, and a high bandwidth are required. That is, it costs a great deal to generate images of a multi-view structure, and to transmit the generated images to each home television through a terrestrial network or a wired network.

Accordingly, there is a desire for a scheme by which a few input views, for example, only one to three input views are generated, and an image processing apparatus that receives the input views, for example, a television generates multi-view images using the input views.

When multi-view images are generated using a limited number of input views, an occlusion region of a background that is hidden by a foreground object in an input view may be indicated as a hole region in a multi-view image.

SUMMARY

The foregoing and/or other aspects are achieved by providing an image processing method including generating an output view and disparity information corresponding to the output view, using at least one input view and disparity information corresponding to the at least one input view, generating a priority for each hole pixel that indicates a hole in the output view using the disparity information corresponding to the output view, and applying hole rendering to the each hole pixel in a descending order of the generated priority.

The foregoing and/or other aspects are also achieved by providing an image processing apparatus including an output view generating unit to generate an output view and disparity information corresponding to the output view, using at least one input view and disparity information corresponding to the at least one input view, a priority generating unit to generate a priority for each hole pixel that indicates a hole in the output view using the disparity information corresponding to the output view, and a hole rendering unit to apply hole rendering to the each hole pixel in a descending order of the generated priority.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
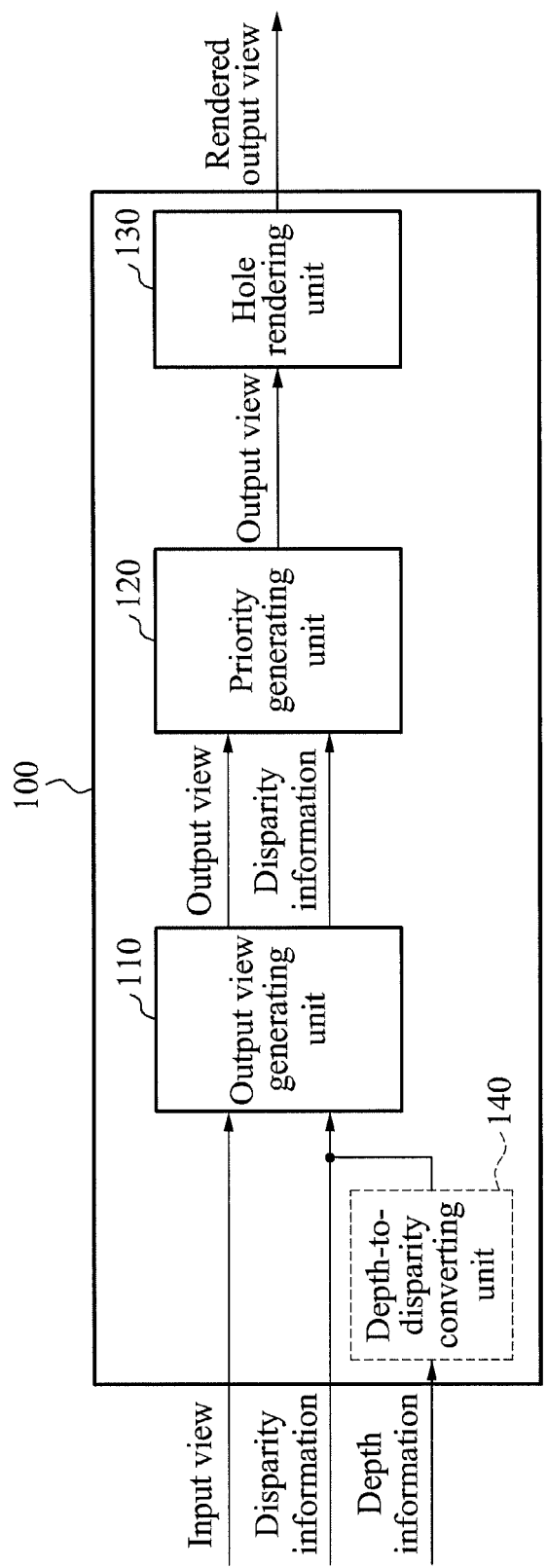
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

In example embodiments, all input images and input depth maps corresponding to the input images may correspond to rectified images and depth maps.

Here, "rectified" may mean that all correspondences between input images may be found on an identical scan line. For example, when two pixels included in two images correspond to each other, the two pixels may have an identical y-coordinate value.

"A depth" and "a disparity" may have an inverse correlation through a constant term. Accordingly, the terms "depth" and "disparity" may be interchangeably used in example embodiments.

Example embodiments may be described under an assumption that an output view may have a horizontal parallax only. That is, example embodiments may be described based on horizontal view interpolation and extrapolation. However, example embodiments may also be applied to a case in which the output view has a vertical parallax. That is, example embodiments may also be applied to vertical view interpolation and extrapolation. Also, example embodiments may be valid when only a single view including a single image and a single depth map is provided as an input.

FIG. 1 illustrates an image processing apparatus 100 according to example embodiments.

The image processing apparatus 100 may include an output view generating unit 110, a priority generating unit 120, and a hole rendering unit 130.

The output view generating unit 110 may generate an output view and disparity information corresponding to the output view, using at least one input view and disparity information corresponding to the at least one input view. An input view may include pixels having x-coordinate values and y-coordinate values. Disparity information of the input view may indicate a disparity value of each pixel in the input view. Here, input views may correspond to images photographed on an identical epipolar line.

An output view may correspond to a view of a predetermined viewpoint. The output view generating unit 110 may generate the output view by projecting an input view using disparity information. The output view generating unit 110 may generate M output views from N input views. Here, N<M.

The output view may include a hole. Herein, a pixel corresponding to a hole may be referred to as a hole pixel.

The priority generating unit 120 may generate a priority for each hole pixel that may indicate a hole in the output view, using the disparity information corresponding to the output view. The priority generating unit 120 may assign a quantified priority to the each hole pixel indicating a hole in the output view.

The hole rendering unit 130 may apply hole rendering to each hole pixel in a descending order of priority. That is, the hole rendering unit 130 may sequentially apply the hole rendering to each hole pixel, starting from a hole pixel having a highest priority. The hole rendering unit 130 may generate a rendered output view to which the hole rendering is applied.

A patch may refer to a region having a predetermined scope, and may have a rectangular form, and the like. A patch of a hole pixel may refer to a patch including the hole pixel. That is, the patch of the hole pixel may refer to a block including the hole pixel in the center of the block.

Hole rendering of a hole pixel may be applied based on a patch basis. That is, the hole rendering units 130 may apply the hole rendering to the entire patch including the hole pixel, when applying the hole rendering to the hole pixel. A patch may include at least one hole pixel. Accordingly, a patch including a hole pixel to which the hole rendering is to be applied may be referred to as a target patch. A patch to be used for rendering the target patch may be referred to as a source patch. That is, the hole rendering unit 130 may apply the hole rendering to the hole pixel, by copying a source patch into a target patch including the hole pixel.

The image processing unit 100 may further include a depth-to-disparity converting unit 140.

The depth-to-disparity converting unit 140 may convert depth information corresponding to the at least one input view into disparity information. Accordingly, the output view generating unit 110 may generate an output view and depth information or disparity information corresponding to the output view, using at least one input view and depth information corresponding to the at least one input view.

In example embodiments, disparity information or a disparity, and depth information or a depth may be used interchangeably.

Figure 2:
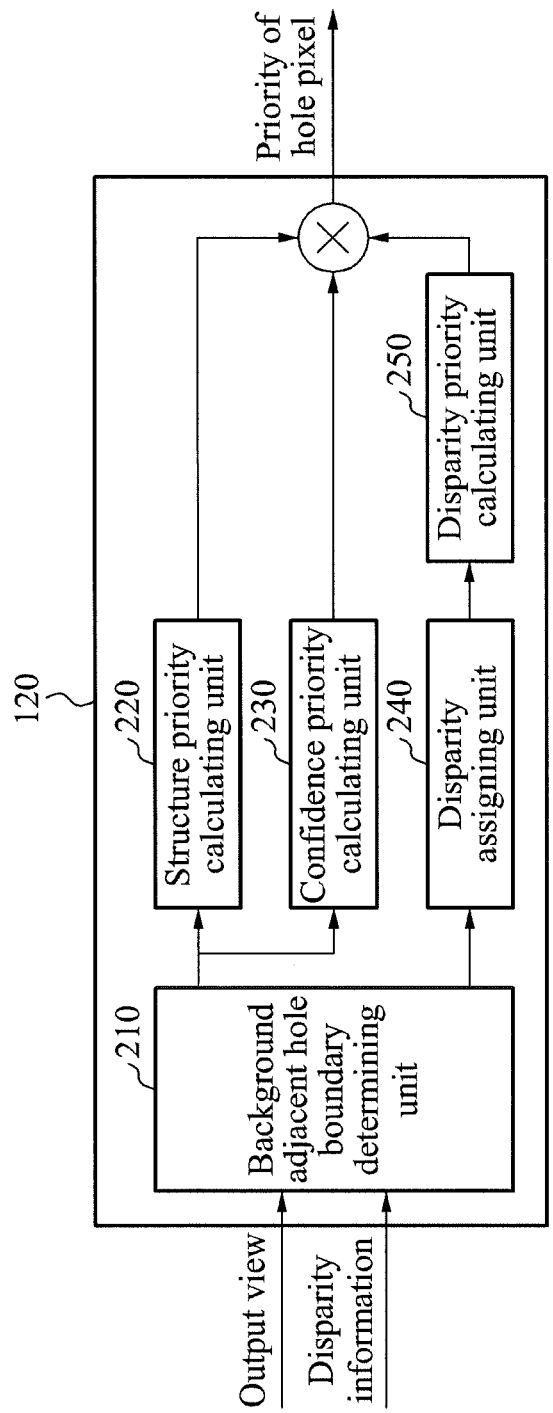
FIG. 2 illustrates a priority generating unit according to example embodiments.

FIG. 2 illustrates the priority generating unit 120 of FIG. 1 according to example embodiments.

The priority generating unit 120 may include a background adjacent hole boundary determining unit 210, a structure priority calculating unit 220, a confidence priority calculating unit 230, a disparity assigning unit 240, and a disparity priority calculating unit 250.

The background adjacent hole boundary determining unit 210 may assign a higher priority to a hole pixel adjacent to a background, rather than a hole pixel adjacent to a foreground in an output view, based on a direction of projection that may be applied by the output view generating unit 110 of FIG. 1 to generate the output view. The background adjacent hole boundary determining unit 210 may assign a priority to each hole pixel so that a hole pixel adjacent to the background may be processed prior to a hole pixel adjacent to the foreground in the output view, based on the direction of projection applied by the output view generating unit 110 to generate the output view.

The structure priority calculating unit 220 may assign a higher priority to a hole pixel that may be located in a visually strong structure in the output view. That is, the structure priority calculating unit 220 may assign a priority to each pixel so that a hole pixel located in the visually strong structure may be processed first. Here, the visually strong structure may include at least one of a corner, a texture, and an edge.

The structure priority calculating unit 220 may assign a higher priority to a hole pixel when a fewer number of patches have a pattern identical to a pattern of a patch including the hole pixel in a region adjacent to the hole pixel. For example, when a number of patches having a first identical pattern is less than a number of patches having a second identical pattern, the structure priority calculating unit 220 may assign a higher priority to a first hole pixel rather than a second hole pixel. Here, the patches having the first identical pattern may refer to patches in a region adjacent to the first hole pixel having a pattern identical to a pattern of a first patch including the first hole pixel. The patches having the second identical pattern may refer to patches in a region adjacent to the second hole pixel having a pattern identical to a pattern of a second patch including the second hole pixel. The adjacent region may correspond to the entire output view.

A patch of a hole pixel may refer to a rectangular region including the hole pixel. The patch of the hole pixel may correspond to a rectangular region where the hole pixel may be located at the center of the rectangular region.

The confidence priority calculating unit 230 may assign a higher priority to a hole pixel when a greater number of pixels not corresponding to holes are included in a patch including the hole pixel.

The disparity information generated by the output view generating unit 110 may not have a disparity value corresponding to a hole pixel. The disparity assigning unit 240 may calculate a disparity of a hole pixel. The disparity assigning unit 240 may calculate the disparity of the hole pixel based on disparities of pixels adjacent to the hole pixel.

The disparity priority calculating unit 250 may assign a priority to a hole pixel based on the disparity of the hole pixel, that is assigned by the disparity assigning unit 240. The disparity assigning unit 240 may assign a higher priority to a hole pixel having a small disparity, rather than a hole pixel having a great disparity.

That is, a priority of a hole pixel may be determined based on at least one of 1) a background adjacent hole boundary priority indicating whether a hole pixel is adjacent to a background adjacent hole boundary according to a direction of projecting a view, 2) a structure priority indicating whether a hole pixel is located in a strong structure, 3) a confidence priority determined based on a number of non-hole pixels in a target patch including a hole pixel, and 4) a disparity priority determined based on a disparity of a hole pixel.

As illustrated in FIG. 2, priorities between the elements 210 through 250, which determine a priority of a hole pixel, may be applied.

As an example, a primary priority of a hole pixel may be determined by the background adjacent hole boundary determining unit 210, and secondary priorities between hole pixels having an identical primary priority may be determined by the structure priority calculating unit 220, the confidence priority calculating unit 230, the disparity assigning unit 240, and the disparity priority calculating unit 250. In FIG. 2, a secondary priority of the hole pixel may be calculated by combining values determined by the structure priority calculating unit 220, the confidence priority calculating unit 230, and the disparity priority calculating unit 250.

As another example, the background adjacent hole boundary determining unit 210 may first determine a background adjacent hole boundary according to a direction of projection, among hole boundaries in an initial output view generated when the input view is warped to a predetermined viewpoint. The background adjacent hole boundary determining unit 210 may determine hole pixels within the determined background adjacent hole boundary to be hole pixels to be rendered firstly. Then, quantified priorities between hole pixels within the determined background adjacent hole boundary may be calculated by combining priorities generated by the structure priority calculating unit 220, the confidence priority calculating unit 230, and the disparity priority calculating unit 250.

Figure 3:
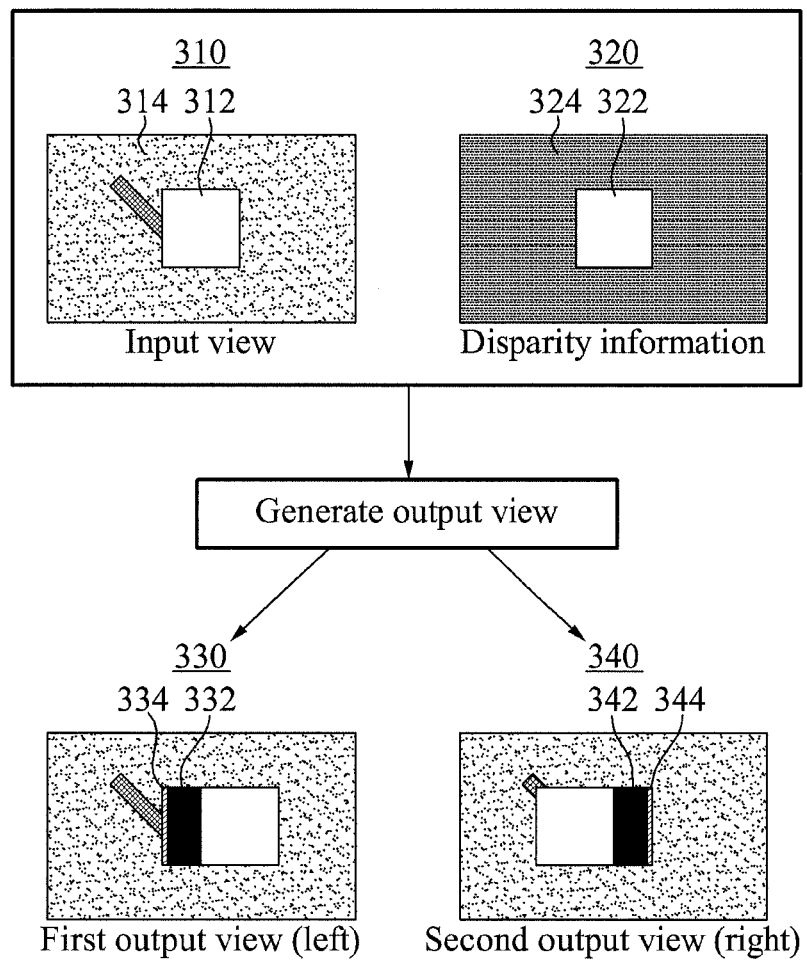
FIG. 3 illustrates a background adjacent hole boundary according to example embodiments.

FIG. 3 illustrates a background adjacent hole boundary according to example embodiments.

In FIG. 3, multi-view output images 330 and 340 that may be generated using an input view 310 and disparity information 320 of the input view 310 are shown.

The input view 310 may include a foreground 312 and a background 314. The disparity information 320 may also include a foreground 322 and a background 324. At least one output view, for example, a first output view 330 and a second output view 340, may be generated based on the input view 310 and the disparity information 320. A viewpoint of the first output view 330 may be directed more to the left side of an object than of a viewpoint of the input view 310. A viewpoint of the second output view 340 may be directed more to the right side of the object than the viewpoint of the input view 310. The output view generating unit 110 of FIG. 1 may generate the first output view 330 and the second output view 340 through extrapolation using the input view 310. That is, the first output view 330 and the second output view 340 may correspond to extrapolated views.

The foreground 312 having a relatively great disparity, that is, an object indicating the foreground 312 may move more than the background 314 having a relatively small disparity, depending on a location for observation, that is, a viewpoint. Due to a difference in the movements, a background region that is hidden by the foreground 312 in the input view 310 may be indicated as a hole 332 or 342 in the output view image 330 or 340. The hole 332 or 342 may be generated in the output view 330 or 340 when a location on which the input view 310 is projected is changed depending on a disparity difference at a disparity boundary in the disparity information 320, that is, a point where a disparity value is changed.

Boundaries between a hole region and a non-hole region will be hereinafter referred to as hole boundaries. Among hole boundaries, background adjacent hole boundaries 334 and 344 according to a direction of projecting a view are shown in FIG. 3.

The hole 332 or 342 may correspond to a background region that is hidden by the foreground 312 in the input view 310. Accordingly, a region of the hole 332 or 342 may be restored only using a region of the background 314 or 324 adjacent to the region of the hole 332 or 342. Accordingly, in order to prevent an error of spreading information of the foreground 312 or 322 into the region of the hole 332 or 342, hole restoration may be performed sequentially, starting from a pixel adjacent to the background 314 or 324, among pixels corresponding to the hole boundary 334 or 344.

As illustrated in the first output view 330, when a view is generated from a predetermined viewpoint in a left direction of the input view 310, a hole boundary on the left side may be adjacent to the background, among hole boundaries. As illustrated in the second output view 340, when a view is generated from a predetermined viewpoint in a right direction of the input view 310, a hole boundary on the right side may be adjacent to the background, among the hole boundaries.

Accordingly, in a case in which the output view generating unit 110 generates an output view from a predetermined viewpoint that is moved in a horizontal direction from a viewpoint of the input view 310, the background adjacent hole boundary determining unit 210 of FIG. 2 may set, as a background adjacent hole boundary, a pixel located at the outermost area of the left side of the hole boundary, among hole pixels on a predetermined horizontal line when a viewpoint of the output view is directed more to the left side of an object than the viewpoint of the input view 310. Conversely, the background adjacent hole boundary determining unit 210 may set, as the background adjacent hole boundary, a pixel located at the outermost area of the right side of the hole boundary, among the hole pixels on the predetermined horizontal line when the viewpoint of the output view is directed more to the right side of the object than the viewpoint of the input view 310.

Also, in a case in which the output view generating unit 110 generates an output view from a predetermined viewpoint that is moved in a vertical direction from the viewpoint of the input view 310, the background adjacent hole boundary determining unit 210 may set, as the background adjacent hole boundary, a pixel located at the outermost area of the upper side of the hole boundary, among hole pixels on a predetermined vertical line when the viewpoint of the output view is directed more to the upper side of the object than the viewpoint of the input view 310. Conversely, the background adjacent hole boundary determining unit 210 may set, as the background adjacent hole boundary, a pixel located at the outermost area of the lower side of the hole boundary, among the hole pixels on the predetermined vertical line when the viewpoint of the output view is directed more to the lower side of the object than the viewpoint of the input view 310.

The priority generating unit 120 may calculate hole priorities for all hole boundary pixels that are set in the output view. The priority generating unit 120 may calculate a structure priority value, a confidence priority value, and a disparity priority value for each of the hole boundary pixels that are set in the output view, and may determine a priority of a hole boundary pixel by combining the structure priority value, the confidence priority value, and the disparity priority value.

Figure 4:
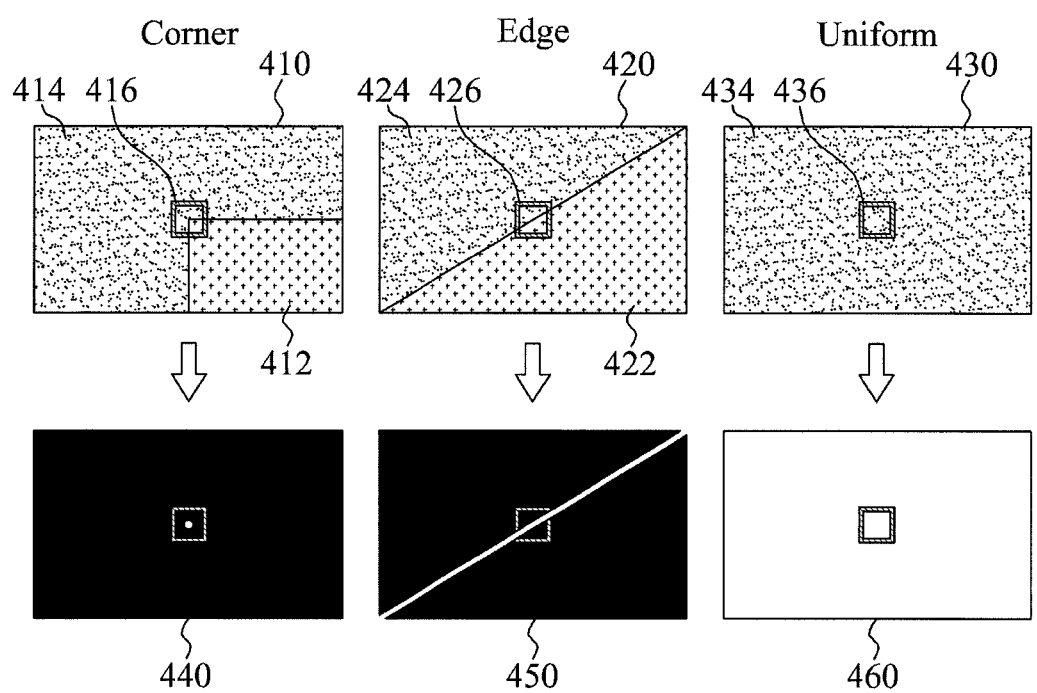
FIG. 4 illustrates calculation of a structure priority according to example embodiments.

FIG. 4 illustrates calculating of a structure priority according to example embodiments.

The structure priority calculating unit 220 of FIG. 2 may analyze, for each hole boundary pixel, whether a hole boundary pixel is located in a visually strong structure, quantify a result of the analysis, and calculate a structure priority of the hole boundary pixel based on a result of the quantified analysis. By first restoring a hole boundary pixel indicating a main structure, among a plurality of hole boundary pixels adjacent to a hole boundary, the hole rendering unit 130 of FIG. 1 may perform hole rendering while maintaining the main structure in the output view.

Schemes of analyzing structure elements will be described, hereinafter.

Scheme of distinguishing a structure based on a number of patches having a pattern identical to a pattern of a target patch including a hole.

In FIG. 4, a first output view 410 indicating a corner, a second output view 420 indicating an edge, a third output view 430 indicating a uniform image are shown. In addition, target patches 416, 426, and 436 of the output views 410, 420, and 430, respectively, are shown as well.

The first output view 410 including a corner region may include two regions 412 and 414 having different colors or different disparities. The second output view 420 including an edge region may include two regions 422 and 424 having different colors or different disparities. The third output view 430 indicating a uniform region only may include a single region 434.

The structure priority calculating unit 220 of FIG. 2 may assign a higher priority to a hole pixel when a fewer number of structures are identical to a structure indicated by the hole pixel in a region adjacent to the hole pixel. The structure priority calculating unit 220 may assign a higher priority to a hole pixel when a fewer number of pixels have a pattern identical to a pattern of a target patch including the hole pixel in the region adjacent to the hole pixel.

Below the output views 410, 420, and 430 are shown images 440, 450, 460 indicating results of searching for patches. In each of the images 440, 450, and 460, a white portion may indicate a center of a patch having a pattern identical to a pattern of the target patch 416, 426, or 436. In the first output view 410 or in a region adjacent to the target patch 416, only the target patch 416 may have a pattern identical to a pattern of the target patch 416. Accordingly, only a single dot may be indicated in white in the first image 440.

In the second output view 420, patches having a pattern identical to a pattern of the target patch 426 may exist along a diagonal line forming a boundary between the first region 424 and the second region 422, that is, along a direction of edge. Accordingly, the diagonal line may be indicated in white in the second image 450.

All patches in the third output view 430 may have patterns identical to a pattern of the target patch 436. Accordingly, the entire third image 460 may be indicated in white in the third image 460.

When a target patch corresponds to a predetermined texture having a random pattern, the target patch may have a characteristic similar to a characteristic of the target patch 416 indicating the corner region. When a target patch corresponds to a repetitive texture having a repeated identical pattern, the target patch may have a characteristic similar to a characteristic of the target patch 426 indicating the edge region.

Accordingly, the structure priority calculating unit 220 may assign higher priorities to hole pixels in an order, starting from 1) a hole pixel indicating a corner, 2) a hole pixel indicating a predetermined texture, 3) a hole pixel indicating an edge, 4) a hole pixel indicating a repetitive texture, and 5) a hole pixel indicating a uniform region.

Whether two patches have identical patterns may be determined based on a difference in red, green, and blue (RGB) values between pixels corresponding to the two patches. That is, the structure priority calculating unit 220 may calculate a difference in RGB values between pixels corresponding to a target patch and a predetermined patch. The structure priority calculating unit 220 may determine that the predetermined patch has a pattern identical to a pattern of the target patch when a sum of differences in RGB values of all corresponding pixels included in both patches is less than a reference value.

The structure priority calculating unit 220 may use, as a structure priority of a hole pixel, an inverse number of a number of points, that is, locations of patches, where an average or a sum of differences of RGB values per pixel with a patch including the hole pixel in a search region is less than a reference value. Here, the search region may refer to a region for searching for patches having identical patterns. For example, a structure priority of the hole pixel in the first output view 410 may correspond to a value of 1/1. As another example, a structure priority of the hole pixel in the third output view 430 may correspond to 1/(a number of pixels in a search region).

Using the aforementioned scheme, the hole rendering unit 130 may apply hole rendering first to a point where a main structure exists around a hole region, that is, a hole pixel.

Scheme of distinguishing a structure based on a size of a change in a brightness value of a hole boundary pixel.

The structure priority calculating unit 220 may calculate a change in a brightness value of a hole boundary pixel in a horizontal direction, for example, a gradient value, and a change in the brightness value of the hole boundary pixel in a vertical direction, as expressed by Equation 1, and may determine a priority of the hole boundary pixel based on a geometric average of the change in the horizontal direction and the change in the vertical direction.

$$I_x = \frac{\partial I(x, y)}{\partial x}, I_y = \frac{\partial I(x, y)}{\partial y}, G(I) = \sqrt{I_x^2 + I_y^2},$$

Equation 1 where x and y denote coordinates of a hole boundary pixel. I(x,y) denotes a brightness value of the hole boundary pixel. $I_x$ denotes a change in the brightness value of the hole boundary pixel in the horizontal direction. $I_y$ denotes a change in the brightness value of the hole boundary pixel in the vertical direction. G(I) denotes a gradient value of the brightness value of the hole boundary pixel.

The structure priority calculating unit 220 may determine a priority of the hole boundary pixel based on a size of the change in the brightness value of the hole boundary pixel. That is, the structure priority calculating unit 220 may normalize the size of the change to be a value greater than or equal to 0 and less than or equal to 1, and may use the normalized value as a quantified value of a structure priority of the hole pixel. Accordingly, the structure priority calculating unit 220 may determine a structure priority so that hole rendering may be applied first to an edge element, that is, a hole boundary pixel indicating an edge, having a relatively great difference in brightness values.

Figure 5:
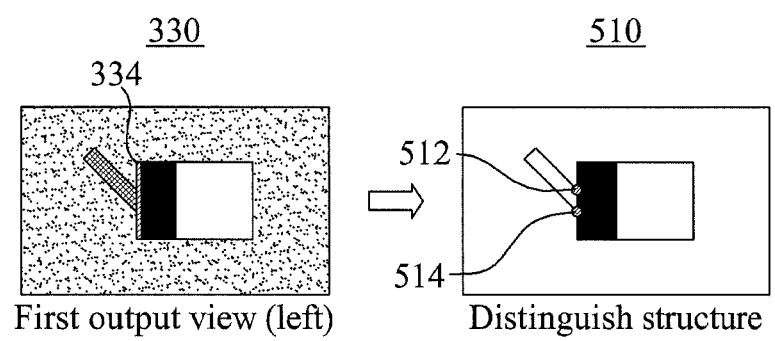
FIG. 5 illustrates a result of distinguishing a structure in an output view generated in a left direction according to example embodiments.

FIG. 5 illustrates a result of distinguishing a structure in an output view generated in a left direction according to example embodiments.

In FIG. 5, a first output view 330 and a background adjacent hole boundary 334 are shown. A result 510 of distinguishing a structure is shown on the right side of the first output view 330. Pixels 512 and 514 corresponding to the structure among hole pixels in the background adjacent hole boundary 334 are shown. The pixels 512 and 514 indicating the structure may have higher structure priorities when compared to other pixels.

Figure 6:
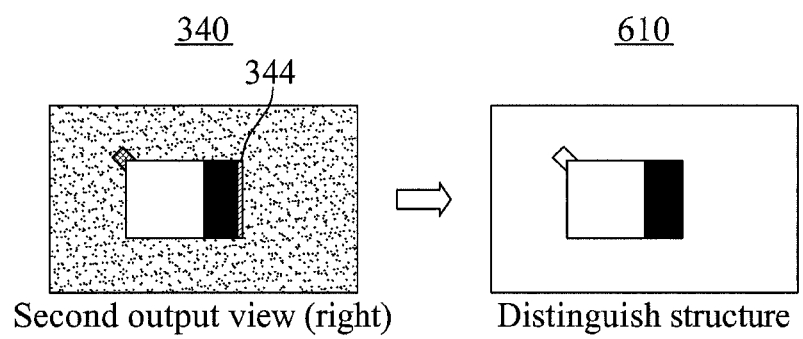
FIG. 6 illustrates a result of distinguishing a structure in an output view generated in a right direction according to example embodiments.

FIG. 6 illustrates a result of distinguishing a structure in an output view generated in a right direction according to example embodiments.

In FIG. 6, a second output view 340 and a background adjacent hole boundary 344 are shown. A result 610 of distinguishing a structure is shown on the right side of the second output view 340. The background adjacent hole boundary 344 may have a uniform pattern. A pixel indicating a structure may not be found, among hole pixels in the background adjacent hole boundary 344. Accordingly, all of the hole pixels within the background adjacent hole boundary 344 may have identical low structure priorities.

Figure 7:
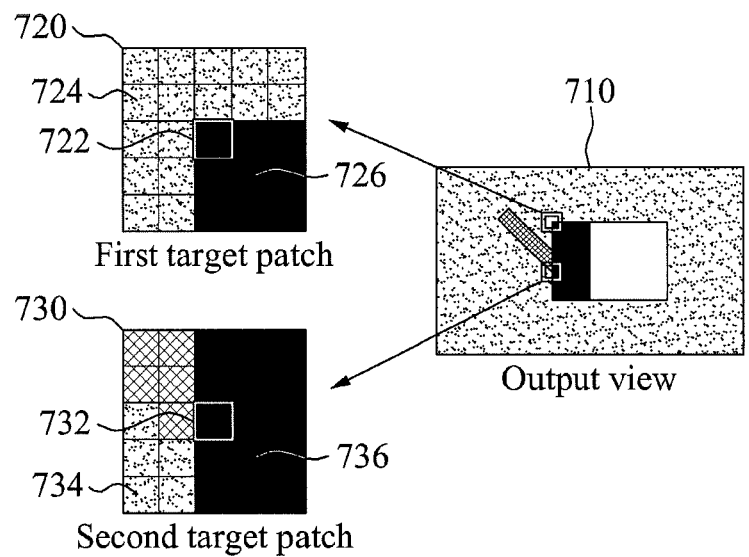
FIG. 7 illustrates a method of determining a confidence priority according to example embodiments.

FIG. 7 illustrates a method of determining a confidence priority according to example embodiments.

When a fewer number of pixels not corresponding to holes are included in a target patch including a hole pixel, a value of the hole pixel, for example, a color value, may be estimated easily, and the hole pixel may be restored easily. Accordingly, the confidence priority calculating unit 230 of FIG. 2 may assign a higher priority to a hole pixel when a greater number of pixels not corresponding to holes are included in a patch including the hole pixel.

A hole region generated during a multi-view synthesizing process may be restored using a background. When a target patch includes a foreground, information about the foreground may cause an error when searching for an optimal patch corresponding to the target patch. Accordingly, when the foreground, that is, pixels indicating the foreground, and the background, that is, pixels indicating the background, are mixed in the target patch, the confidence priority calculating unit 230 may regard the foreground as a hole region. That is, the confidence priority calculating unit 230 may assign a higher priority to a hole pixel when a greater number of background pixels not corresponding to holes are included in a patch including the hole pixel.

In FIG. 7, two hole pixels 722 and 732 in an output view 710 are shown, and target patches 720 and 730 including the hole pixels 722 and 732 are shown.

The first target patch 720 may include a background region 724 and a hole region 726. Sixteen pixels may be included in the background region 724 of the first target patch 720. The second target patch 730 may include a background region 734 and a hole region 736. Ten pixels may be included in the background region 734 of the second target patch 730. Accordingly, the first hole pixel 722 may have a higher confidence priority than the second hole pixel 732.

A confidence priority may be determined as expressed by Equation 2.

$$C(p) = \frac{\text{number of background pixels not corresponding to holes in target patch}}{\text{number of pixels in target patch}}, \quad \text{Equation 2}$$

where C(p) denotes a confidence priority of a hole pixel p.

Figure 8:
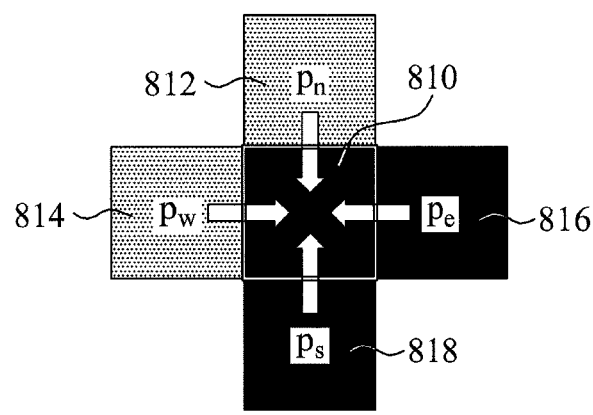
FIG. 8 illustrates a method of determining a disparity priority according to example embodiments.

FIG. 8 illustrates a method of determining a disparity priority according to example embodiments.

In FIG. 8, a hole pixel 810 and pixels 812, 814, 816, and 818 that are adjacent to the hole pixel 810 are shown. Each of the adjacent pixels 812, 814, 816, and 818 may have a disparity. A hole pixel among the adjacent pixels 812, 814, 816, and 818 may not have a disparity. In this instance, an adjacent pixel that does not have a disparity may be excluded in determining a disparity priority of the hole pixel 810.

When an output view is generated by the output view generating unit 110 of FIG. 1, the hole pixel 810 in the output view may not have a disparity. The disparity assigning unit 240 of FIG. 2 may use a disparity of the adjacent pixel 812, 814, 816, or 818 as the disparity of the hole pixel 810, based on disparities of the pixels 812, 814, 816, and 818 adjacent to the hole pixel 810. When the adjacent pixels 812, 814, 816, and 818 have different disparities, the disparity assigning unit 240 may use, as the disparity of the hole pixel 810, a greatest disparity among the disparities of the pixels 812, 814, 816, and 818 adjacent to the hole pixel 810. That is, when the hole pixel 810 is located on a boundary between a background and a foreground, the disparity assigning unit 240 may determine a priority of the hole pixel 810 to be relatively low, using a disparity of an adjacent pixel indicating the foreground as the disparity of the hole pixel 810.

The disparity assigning unit 240 may use, as the disparity of the hole pixel 810, an inverse number of the greatest value among the disparities of the pixels 812, 814, 816, and 818 adjacent to the hole pixel 810, as expressed by Equation 3.

$$D(p) = \frac{1}{\text{Max}(\text{disparity}(p_n), \text{disparity}(p_s), \text{disparity}(p_e), \text{disparity}(p_w))}, \quad \text{Equation 3}$$

where p denotes the hole pixel 810. D(p) denotes a disparity priority of the hole pixel 810. Disparity ($p_n$), disparity ($p_w$), disparity ($p_e$), and disparity ($p_s$) denote a disparity of the pixel 812 located on the upper side of the hole pixel 810, a disparity of the pixel 814 located on the left side of the hole pixel 810, a disparity of the pixel 816 located on the right side of the hole pixel 810, and a disparity of the pixel 818 located on the lower side of the hole pixel 810, respectively. The Max function may return a greatest factor among factors.

The priority generating unit 120 of FIG. 1 may determine a priority of a hole boundary pixel by combining a structure priority value, a confidence priority value, and a disparity priority value, as expressed by Equation 4.

$$P(p) = (\alpha \cdot S(p)) \times (\beta \cdot C(p)) \times (\gamma \cdot D(p)), \quad \text{Equation 4}$$

where P(p) denotes a priority of a hole pixel p. S(p), C(p), and D(p) denote a structure priority, a confidence priority, and a disparity priority of the hole pixel p, respectively. α, β, and γ denote a weight of S(p), a weight of C(p), and a weight of D(p), respectively.

Using the aforementioned method of determining a priority of a hole boundary pixel, the hole rendering unit 130 of FIG. 1 may apply hole restoration firstly to a background hole pixel 1) when the background hole pixel is in a structure, 2) when a relatively great number of pixels not corresponding to holes are included in a patch including the background hole pixel, 3) when the background hole pixel has a relatively small disparity. The hole restoration may be performed while maintaining a structure of the background.

Figure 9:
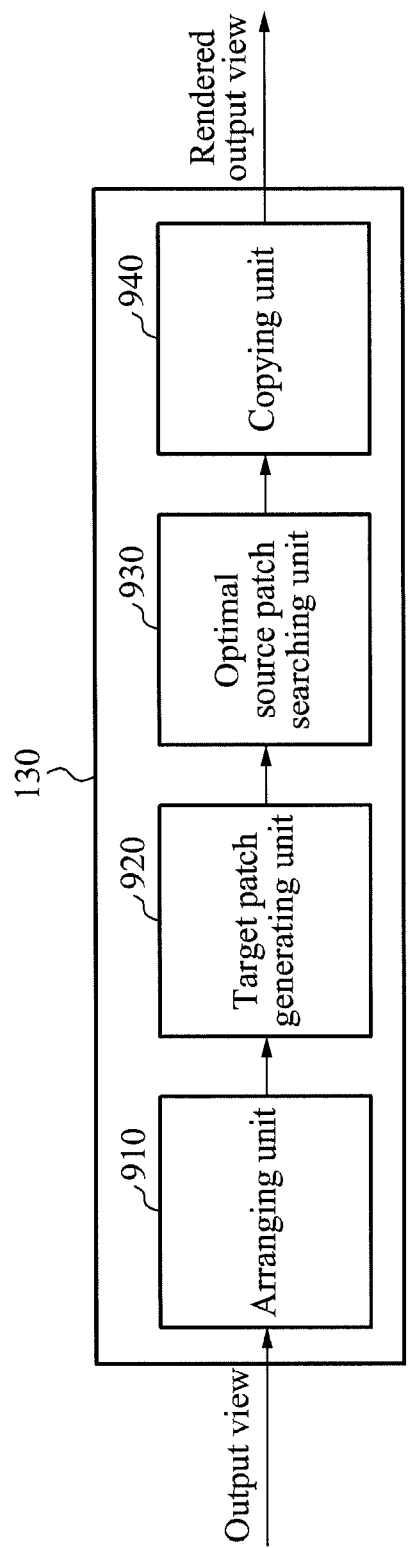
FIG. 9 illustrates a hole rendering unit according to example embodiments.

FIG. 9 illustrates the hole rendering unit 130 of FIG. 1 according to example embodiments.

The hole rendering unit 130 may include an arranging unit 910, a target patch generating unit 920, an optimal source patch searching unit 930, and a copying unit 940.

The arranging unit 910 may arrange priorities of hole pixels. The arranging unit 910 may identify a hole pixel having a highest priority.

The target patch generating unit 920 may determine a target patch. Here, the target patch may correspond to a block including the hole pixel having the highest priority in the center of the block.

The optimal source patch searching unit 930 may search for a source patch corresponding to a block most similar to the target patch in an output view.

The optimal source patch searching unit 930 may calculate a similarity between the target patch and the source patch based on the following criteria 1 through 3.

Criterion 1: a difference in RGB values between a pixel of the target patch and a pixel of the source patch corresponding to the pixel of the target patch.

Criterion 2: a difference between a block structure of the target patch and a block structure of the source patch. Here, the block structure may indicate that a pixel having a brightness value greater than a reference value may set to 1, and a pixel having a brightness value less than the reference value may set to 0, among pixels included in a patch. The optimal source patch searching unit 930 may calculate a bitwise difference value between the block structure of the target patch and the block structure of the source patch.

Criterion 3: a difference between spatial coordinates of the target patch and spatial coordinates of the source patch.

The optimal source patch searching unit 930 may determine, to be the source patch, a patch having a smallest weighted average of resulting values obtained based on the aforementioned criteria 1 through 3.

The copying unit 940 may restore the hole pixel having the highest priority by copying a pixel in the found source patch into a hole pixel in the target patch.

Figure 10:
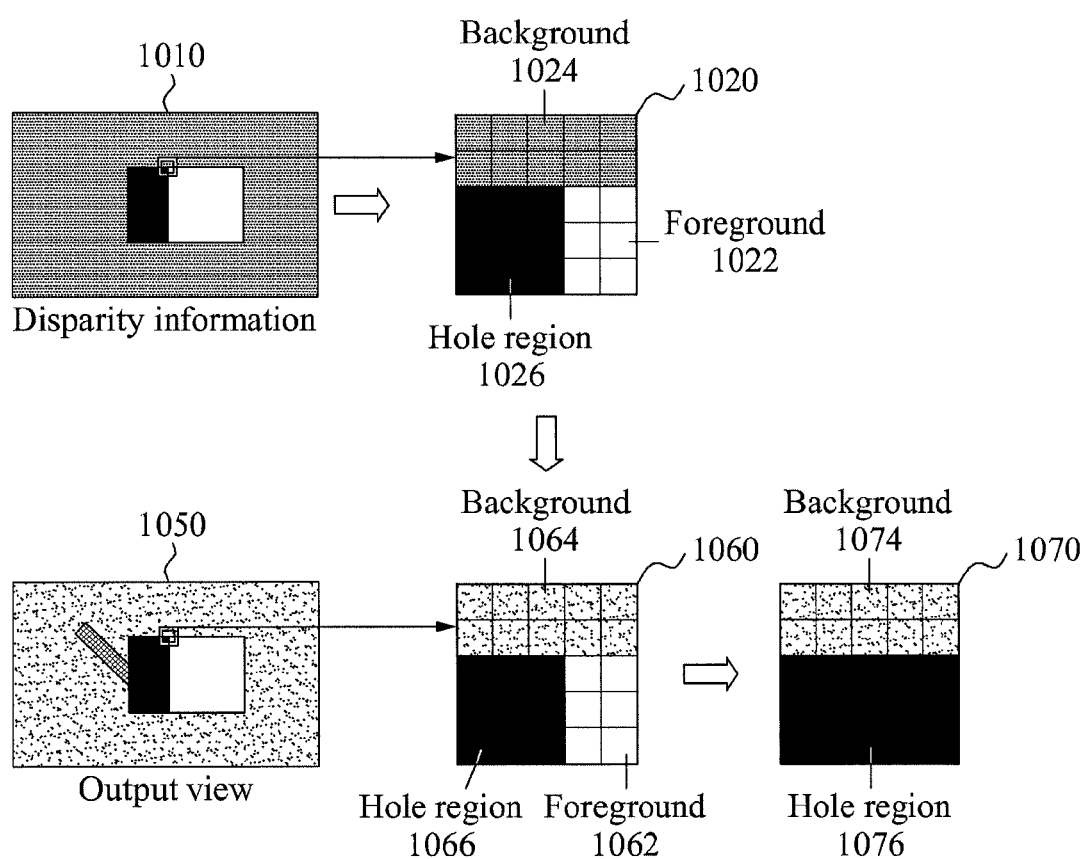
FIG. 10 illustrates a method of searching for an optimal source patch according to example embodiments.

FIG. 10 illustrates a method of searching for an optimal source patch according to example embodiments.

In FIG. 10, an output view 1050, and disparity information 1010 of the output view 1050 are shown.

A target patch 1060 may include a foreground 1062, a background 1064, and a hole region 1066. That is, the foreground 1062 and the background 1064 may be mixed in the target patch 1060. The disparity information 1020 of the target patch 1060 may include a foreground 1022, a background 1024, and a hole region 1026 as well.

In a case in which a foreground is absent in a target patch, the optimal source patch searching unit 930 of FIG. 9 may search for a most similar background in an output view. However, as illustrated in FIG. 10, in a case in which both the foreground 1062 and the background 1064 are included in the target patch 1060, the optimal source patch searching unit 930 may select a patch similar to the foreground 1062 as a source patch when the foreground 1062 fails to be separated from the target patch 1060. In this instance, the optimal source patch searching unit 930 may restore, in error, the hole region 1066 using information indicating the foreground 1062. Such an error may indicate that the foreground 1062 spreads into the hole region 1066.

The optimal source patch searching unit 930 may classify pixels in the target patch 1060 into foreground pixels and background pixels, by analyzing disparities of the pixels.

When the disparities of the pixels in the target patch 1060 are classified into a single group, the optimal source patch searching unit 930 may regard all of the pixels in the target patch 1060 as a background. When the disparities of the pixels in the target patch 1060 are classified into two groups, the optimal source patch searching unit 930 may regard pixels included in a group corresponding to relatively low disparities as a background, and may regard pixels included in the other group corresponding to relatively high disparities as a foreground. When the disparities of the pixels in the target patch 1060 are classified into at least three groups, the optimal source patch searching unit 930 may regard only pixels included in a group corresponding to lowest disparities as a background, and may regard pixels included in the other groups as a foreground.

The optimal source patch searching unit 930 may select background pixels from only the pixels in the target patch, based on the disparities of the pixels in the target patch, and may determine, to be a source patch, pixels most similar to the selected background pixels, among background pixels adjacent to the target patch. That is, the optimal source patch searching unit 930 may determine the source patch using the background pixels only among the pixels in the target patch.

In FIG. 10, a target patch 1070 in which only background pixels are selected is shown. The target patch 1070 in which only the background pixels are selected may include a background 1074 and a hole region 1076 only. A region corresponding to the foreground 1062 in the target patch 1060 may be a part of the hole region 1076 in the target patch 1070 in which only the background pixels are selected.

When an output view is generated through extrapolation, a background that is hidden by a foreground in an input view may be observed in the generated output view. The hidden region may be indicated as a hole region in the output view. Accordingly, the hole region may be restored using information about the background only, excluding information about the foreground. By restoring the hole region while maintaining a structure of the background, a visually natural result may be obtained. Accordingly, the optimal source patch searching unit 930 may search for an optimal source patch based on the background, excluding the foreground from the target patch.

Figure 11:
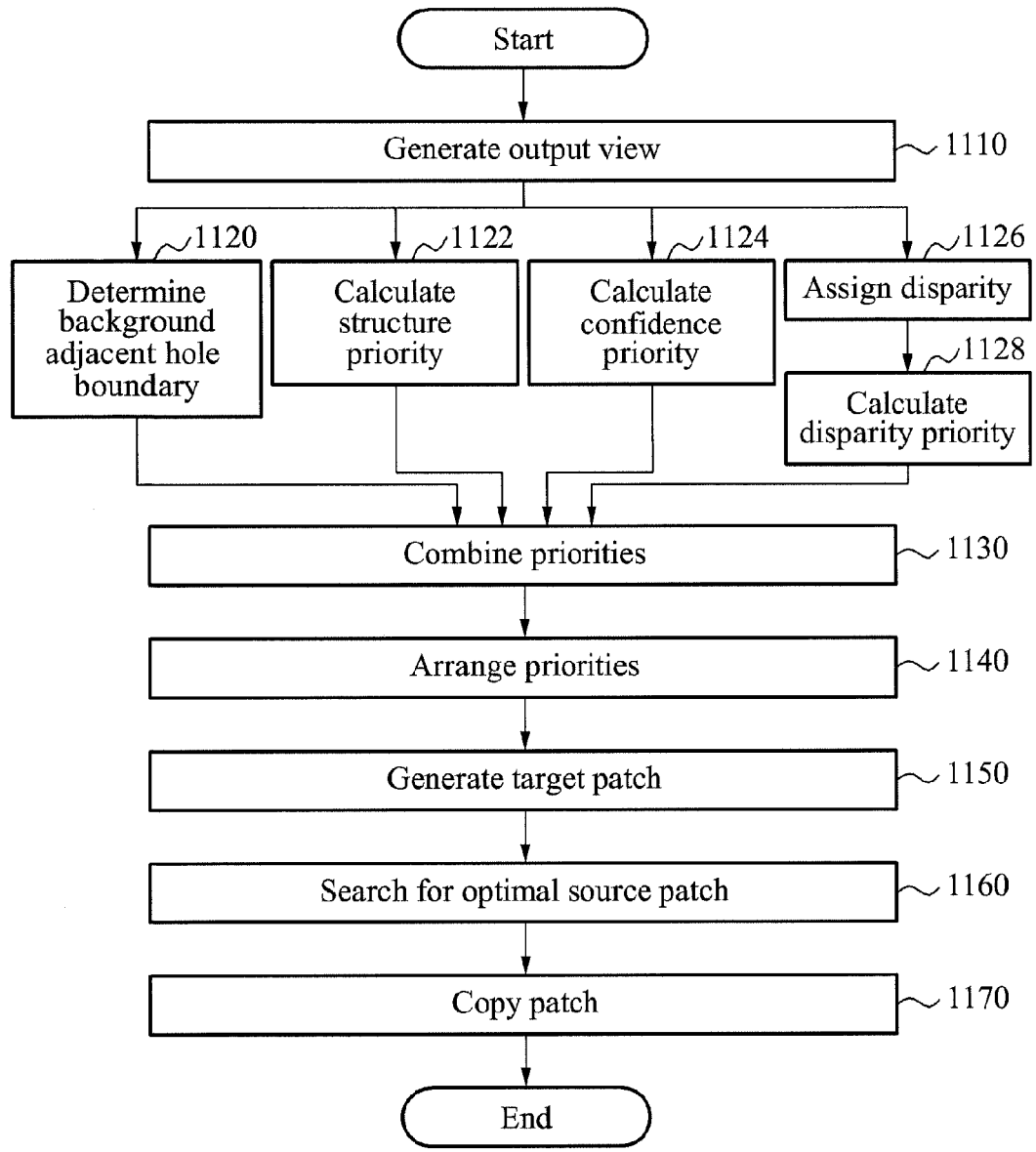
FIG. 11 illustrates an image processing method according to example embodiments.

FIG. 11 illustrates an image processing method according to example embodiments.

In operation 1110, an output view and disparity information corresponding to the output view may be generated using at least one input view and disparity information corresponding to the input view.

In operations 1120 through 1130, a priority for each hole pixel indicating a hole in the output view may be generated using the disparity information corresponding to the output view.

In operation 1120, a higher priority may be assigned to a hole pixel adjacent to a background rather than a hole pixel adjacent to a foreground of the output view, based on a direction of projection that is applied for generating the output view in operation 1110.

In operation 1122, a higher structure priority may be assigned to a hole pixel that is located in a visually strong structure. Also, a higher structure priority may be assigned a hole pixel when a fewer number of pixels have a pattern identical to a pattern of a patch including the hole pixel in a region adjacent to the hole pixel.

In operation 1124, a higher confidence priority may be assigned to a hole pixel when a greater number of pixels not corresponding to holes are included in a patch including the hole pixel.

In operation 1126, a disparity of the hole pixel may be calculated based on disparities of pixels adjacent to the hole pixel. the calculated disparity may be assigned to the hole pixel.

In operation 1128, a disparity priority of the hole pixel may be calculated based on the assigned disparity of the hole pixel.

In operation 1130, the priority of the hole pixel may be calculated by combining the structure priority, the confidence priority, and the disparity priority, and the calculated priority may be assigned to the hole pixel.

In operations 1140 through 1170, hole rendering may be applied to each hole pixel in a descending order of priority.

In operation 1140, priorities of hole pixels may be arranged.

In operation 1150, a target patch corresponding to a block including a hole pixel having a highest priority in the center of the block may be determined.

In operation 1160, a source patch corresponding to a block most similar to the target patch in the output view may be searched for.

In operation 1160, 1) an operation of selecting background pixels from pixels in the target patch based on disparities of the pixels in the target patch, and 2) an operation of determining, to be a source patch, pixels most similar to the selected background pixels among background pixels adjacent to the target patch may be performed.

In operation 1170, a pixel in the source patch may be copied into a hole pixel in the target patch.

The same descriptions previously described with reference to FIGS. 1 through 10 may be applied to the foregoing example embodiments with reference to FIG. 11. Accordingly, further descriptions will be omitted for conciseness.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing method comprising:
   generating an output view and disparity information corresponding to the output view, using at least one input view and disparity information corresponding to the at least one input view;
   generating a priority for each hole pixel that indicates a hole in the output view using the disparity information corresponding to the output view; and
   applying hole rendering to the each hole pixel in a descending order of the generated priority.

2. The method of claim 1, wherein the generating of the priority comprises assigning a higher priority to a hole pixel adjacent to a background than a hole pixel adjacent to a foreground in the output view, based on a direction of projection that is applied to generate the output view in the generating of the disparity information.

3. The method of claim 1, wherein the generating of the priority comprises assigning a higher priority to a hole pixel that is located in a visually strong structure.

4. The method of claim 1, wherein the generating of the priority comprises assigning a higher priority to a hole pixel when a fewer number of patches have a pattern identical to a pattern of a patch including the hole pixel in a region adjacent to the hole pixel.

5. The method of claim 1, wherein the generating of the priority comprises assigning a higher priority to a hole pixel when a greater number of pixels not corresponding to holes are included in a patch including the hole pixel.

6. The method of claim 1, wherein the generating of the priority comprises calculating a disparity of a hole pixel based on disparities of pixels adjacent to the hole pixel.

7. The method of claim 6, wherein the generating of the priority further comprises assigning a priority to the hole pixel based on the calculated disparity.

8. The method of claim 1, wherein the applying of the hole rendering to the each hole pixel comprises:
   determining a target patch corresponding to a block including a hole pixel having a highest priority in the center of the block;
   searching for a source patch corresponding to a block most similar to the target patch in the output view; and
   copying a pixel in the source patch into a hole pixel in the target patch.

9. The method of claim 8, wherein the searching for the source patch comprises:
   selecting at least one background pixel from at least one pixel in the target patch, based on at least one disparity of the at least one pixel in the target patch; and
   determining, to be the source patch, at least one pixel most similar to the at least one background pixel selected, among at least one background pixel adjacent to the target patch.

10. A non-transitory computer-readable medium comprising a program for instructing a computer to perform the method of claim 1.

11. An image processing apparatus comprising:
   a computer which executes instructions to provide:
      an output view generating unit to generate an output view and disparity information corresponding to the output view, using at least one input view and disparity information corresponding to the at least one input view;
      a priority generating unit to generate a priority for each hole pixel that indicates a hole in the output view using the disparity information corresponding to the output view; and
      a hole rendering unit to apply hole rendering to the each hole pixel in a descending order of the generated priority.

12. The apparatus of claim 11, wherein the priority generating unit comprises a background adjacent hole boundary determining unit to assign a higher priority to a hole pixel adjacent to a background than a hole pixel adjacent to a foreground in the output view, based on a direction of projection that is applied by the output view generating unit to generate the output view.

13. The apparatus of claim 11, the apparatus further comprises a depth-to-disparity converting unit to converting depth information corresponding to at least one input view into disparity information.

14. An image processing method comprising:
   generating an output view and disparity information corresponding to the output view, using at least one input view and disparity information corresponding to the at least one input view;
   generating a priority for a plurality of hole pixels that indicate holes in the output view using the disparity information corresponding to the output view; and
   applying hole rendering to the plurality of hole pixels in a descending order of the generated priority.

15. The method of claim 14, wherein the generating of the priority comprises assigning a higher priority to a hole pixel adjacent to a background than a hole pixel adjacent to a foreground in the output view, based on a direction of projection that is applied to generate the output view in the generating of the disparity information.

16. The method of claim 14, wherein the generating of the priority comprises assigning a higher priority to a hole pixel that is located in a visually strong structure.

17. The method of claim 14, wherein the generating of the priority comprises assigning a higher priority to a hole pixel when a fewer number of patches have a pattern identical to a pattern of a patch including the hole pixel in a region adjacent to the hole pixel.

18. The method of claim 14, wherein the generating of the priority comprises assigning a higher priority to a hole pixel when a greater number of pixels not corresponding to holes are included in a patch including the hole pixel.

19. The method of claim 14, wherein the generating the priority comprises generating the priority by a combination of at least two of the following:

assigning a higher priority to a hole pixel adjacent to a background than a hole pixel adjacent to a foreground in the output view, based on a direction of projection that is applied to generate the output view in the generating of the disparity information, assigning a higher priority to a hole pixel adjacent to a background than a hole pixel adjacent to a foreground in the output view, based on structure, assigning a higher priority to a hole pixel when a fewer number of patches have a pattern identical to a pattern of a patch including the hole pixel in a region adjacent to the hole pixel, and assigning a higher priority to a hole pixel when a greater number of pixels not corresponding to holes are included in a patch including the hole pixel.

20. The method of claim 1, wherein the generating the priority comprises generating the priority by a combination of at least two of the following:

assigning a higher priority to a hole pixel adjacent to a background than a hole pixel adjacent to a foreground in the output view, based on a direction of projection that is applied to generate the output view in the generating of the disparity information, assigning a higher priority to a hole pixel that is located in a visually strong structure, assigning a higher priority to a hole pixel when a fewer number of patches have a pattern identical to a pattern of a patch including the hole pixel in a region adjacent to the hole pixel, and assigning a higher priority to a hole pixel when a greater number of pixels not corresponding to holes are included in a patch including the hole pixel.

* * * * *